July 9, 1968    C. A. GOVATSOS    3,391,827
DISPENSING ARTICLES FROM A STACK BY FLUID PRESSURES
Filed Feb. 15, 1967    6 Sheets-Sheet 3

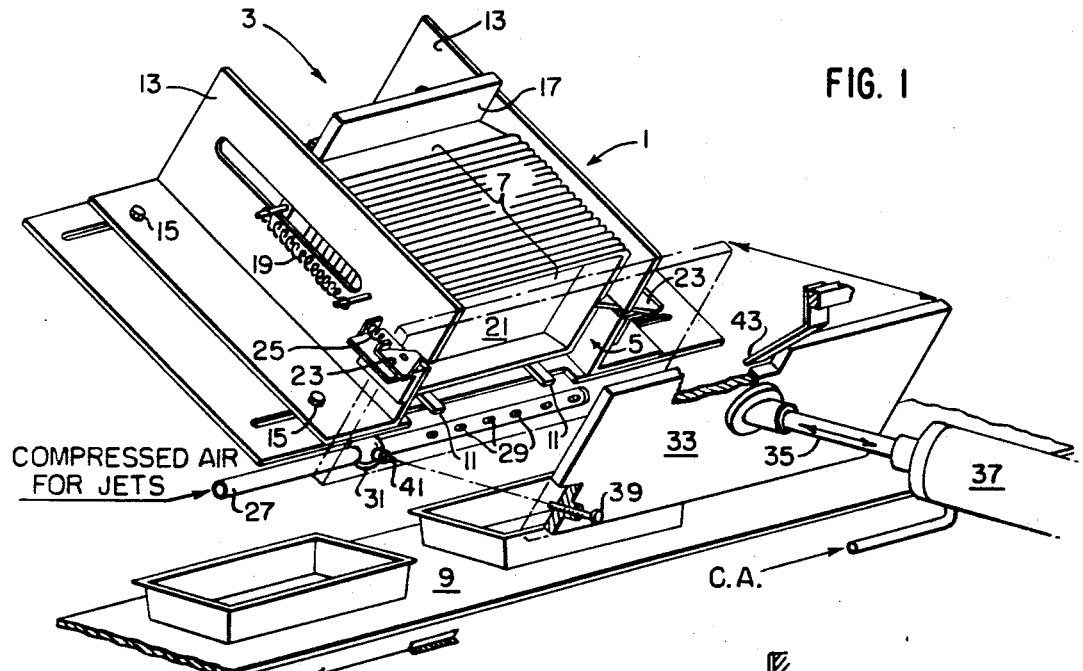
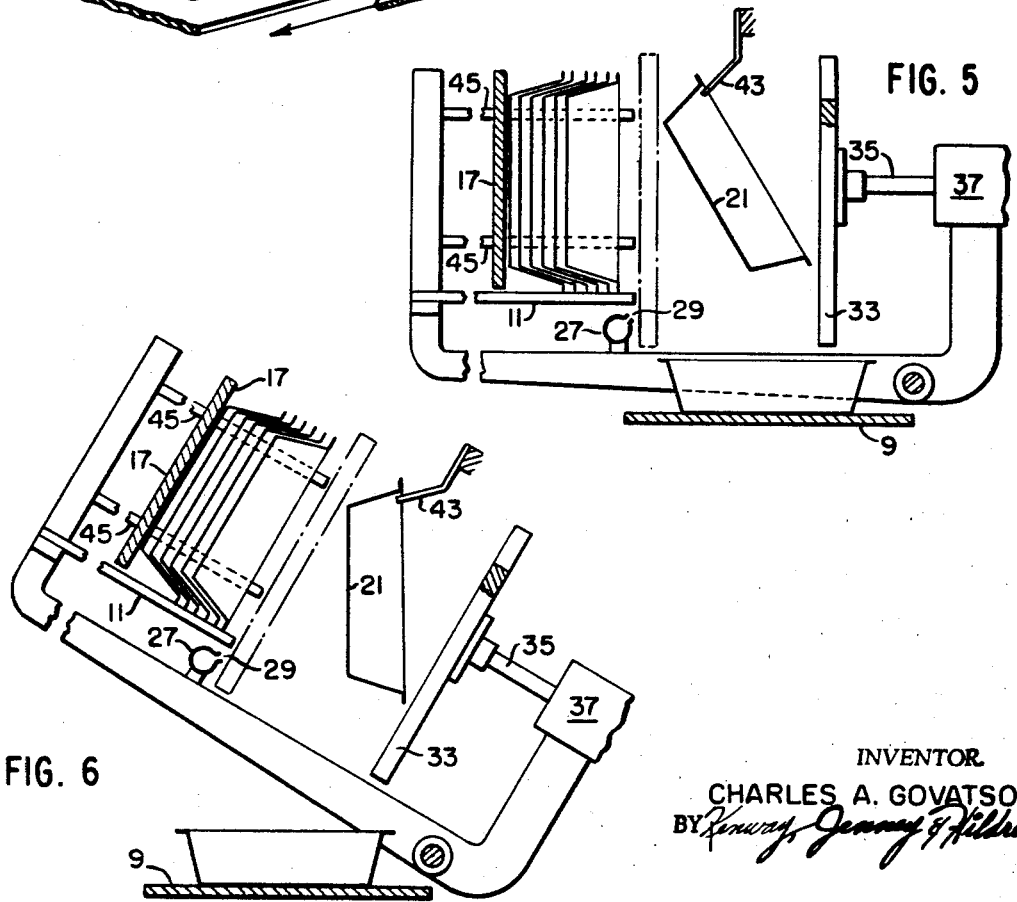
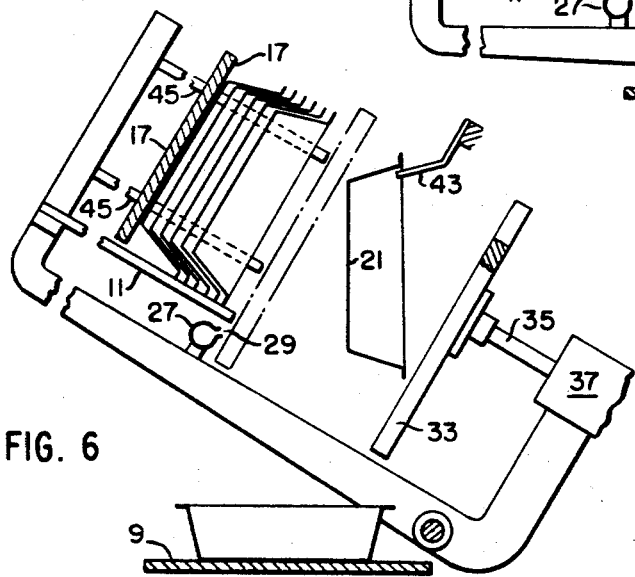

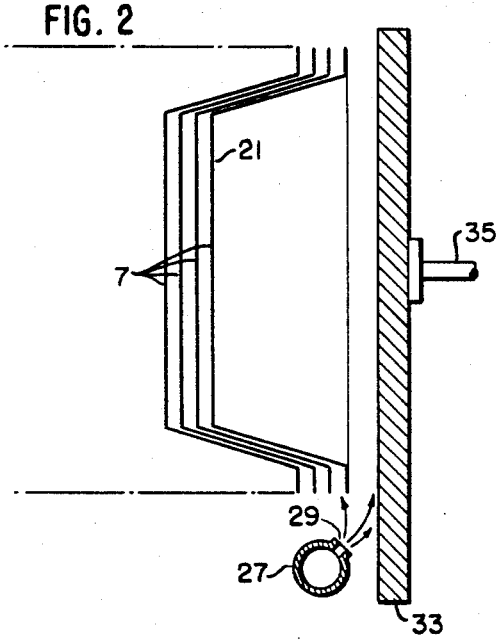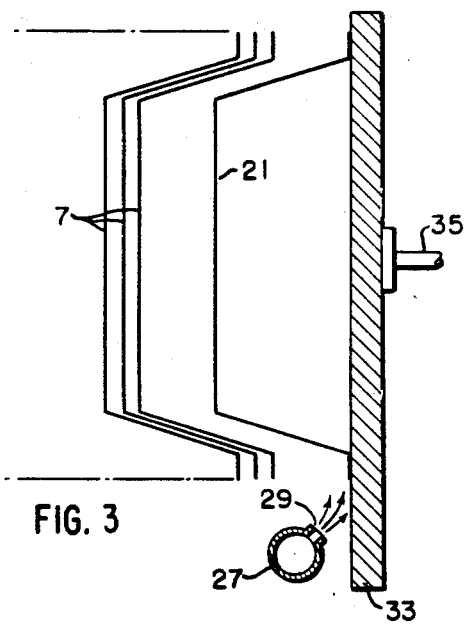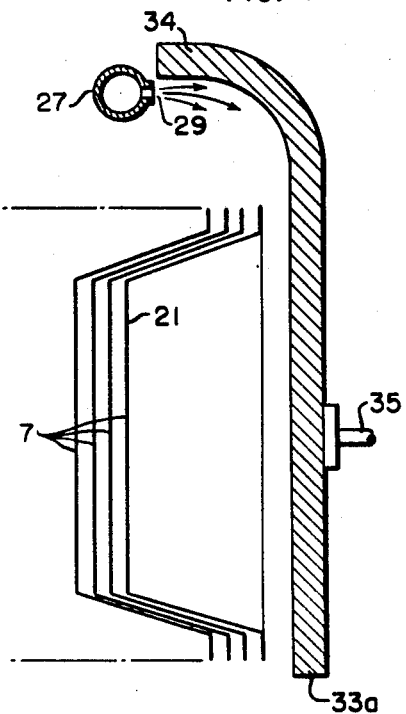

INVENTOR
CHARLES A. GOVATSOS
BY,
ATTORNEYS

INVENTOR
CHARLES A. GOVATSOS
BY,

ATTORNEYS

United States Patent Office 3,391,827
Patented July 9, 1968

3,391,827
DISPENSING ARTICLES FROM A STACK
BY FLUID PRESSURES
Charles A. Govatsos, Wellesley, Mass., assignor to
Bextic Incorporated, Natick, Mass., a corporation
of Massachusetts
Continuation-in-part of application Ser. No. 474,730,
July 26, 1965. This application Feb. 15, 1967, Ser.
No. 622,874
15 Claims. (Cl. 221—172)

ABSTRACT OF THE DISCLOSURE

To detach containers singly from a nested stack, a plate is juxtaposed with the open face of the leading container and extends beyond a peripheral edge of this open face. Air is projected upon the extended portion of the plate and upon the exposed edges of the leading containers. In consequence of the positive and negative pressures thus developed, the leading container is detached and separated from the others. The plate may then be retracted from its juxtaposed position and the leading container alone follows it. When the retraction has proceeded to such a point that the separated container is clear of the stack the air stream is deactivated, pressures on the two faces of the separated container are equalized, and it is removed, e.g., by falling away from the plate. (In special cases, movement of the plate may be dispensed with.) Several different mechanisms are described for urging the stack into position for the air stream action and for preventing detachment of all containers but the leading one.

---

This application is a continuation-in-part of an application of Charles A. Govatsos, Ser. No. 474,730, filed July 26, 1965 and to be abandoned.

The subject of this invention is the dispensing of open-faced containers or receptacles, one by one, from a stack in which they are arranged in nested fashion, for individual further treatment or use; e.g., dyeing, washing or packing.

As the costs of personal service become an ever greater fraction of the operating costs of merchandising establishments, vendors whose wares are small, inexpensive items in large numbers have inclined toward self-service by the customer. In many cases this requires that each item offered for sale be packaged beforehand and packaged in such a way that the customer can examine it through a transparent wrapper, pick it up without injuring it, and carry it to an exit counter where he pays for it. For this purpose the food industry, to take but a single example, requires, each year, millions of containers for fruit, certain vegetables, meats, candy and the like. Because of these enormous numbers, the fabrication costs of such containers are kept as low as possible. Accordingly, they are usually made of folded paper or molded plastic, and each container utilizes a minimum of material. Thus, containers are fabricated of molded plastic material of which the thickness is only a few mils, strength being imparted to the container by virtue of its shape. Despite the minute thickness of the material, containers thus constructed may have depth dimensions ranging from a fraction of an inch to several inches and length and width dimensions several times as great as their depths.

Because of the exceeding thinness of the base material, the weight of each container is but a fraction of an ounce. The large overall dimensions and low weights of individual containers and the large number of like containers required by a user suggest that like containers be transported and delivered as a nested stack. To this end the sides of the container are usually sloped in such a way that such nesting is facilitated, whereupon two occupy a volume only slightly greater than the volume occupied by one, and several hundred like containers can be nested in a stack and placed in a package whose cross section is that of a single container while its length may be of the order of a foot or so hence not inconvenient for handling and shipment.

In use the containers must be individually filled with the items of merchandise they are to contain; and this entails detaching them, one by one, from the nested stack in which they are received and passing them individually to a packer, human or mechanical. Various contrivances have been proposed which undertake, by suction applied to the open face of the uppermost container of the nested stack or by mechanically picking its upper edge, to detach it from the stack and repeat the operation for the next container. These contrivances are uncertain and unreliable in operation, sometimes removing two or three containers, instead of a single one. This, of course, interferes with the packing or filling operation.

The present invention has for its objects to detach the first and only the first container of a nested stack on the first of a series of consecutive cycles of operation; and to duplicate the detachment operation for each higher numbered container on the next and each higher numbered operation cycle.

It attains these objects by projecting a stream of air against an extended portion of a plate that is juxtaposed with the open face of the leading container of the stack and overlies at least a part of this open face, and against the peripheral edges of the first few containers. This plate may be slightly spaced from the open face of the leading container or it may be in snug contact with its edges. One part of the air stream, i.e., the part that impinges on the edges of the first few containers, particularly the edges of the first and second containers, enters the interstices between them and so develops a positive pressure between each container and the next one; and because the center line of the air stream is directed at or beyond the edge of the leading container, these positive pressures diminish progressively from each container to the next. Of that part of the air stream which impinges on the extended portion of the plate, some is deflected toward the edges of the containers and some travels rapidly under the plate and over the open face of the leading container from the nearest edge to the opposite edge, thus to develop a negative pressure over this face. Thus the pressure difference is in one sense for the leading container and in the opposite sense for all of the others. As a result, the leading container is moved "forward," i.e., toward the plate while the other containers are moved "backward," i.e., away from the plate. With the containers of sufficiently shallow depths and an air jet of sufficient force, the forward movement of the first container and the backward movements of the others may be sufficient, without more, to permit removal of the leading container, thus detached. Moreover, the backward forces on the remaining containers prevent detachment and removal of all but the leading one.

Especially with containers of substantial depths or weights, it is advantageous to supplement the pressure-generated relative movement between the plate and the stack as a whole with a retraction movement of the plate itself from its initial juxtaposed position. The leading container, drawn by the negative air pressure toward the plate, follows it in its movement. When the retraction movement has proceeded to a suitable point, the leading container falls away from the plate. It may be oriented in its fall so as to alight in a desired attitude on a suitable receiving element, e.g., a conveyor belt. At or just before the instant at which the fall takes place, the stream of air may advantageously be turned off, to ensure that the fall shall take place without interference from moving air. After the detachment and removal of the leading container have been completed, the plate may be returned to its initial juxtaposed position, whereupon the foregoing operations may be repeated for the next container of the original stack, now in its turn the leading one of the reduced stack.

The principles of operation are the same, whether the plate be moved with respect to the remainder of the apparatus or, the plate remaining fixed, the stack as a whole be moved in the reverse direction, e.g., by the air pressures, and so away from the leading container to be detached. In other words, successful operation depends on relative movement between the plate and the stack, rather than on movement either of the plate or of the stack relatively to the remainder of the apparatus. But retraction and return of the plate relatively to the apparatus are of especial advantage in embodiments in which the plate, in its initial juxtaposed position, is in snug engagement or close proximity with the open face of the leading container so that, without movement of the plate, removal of the leading container might present ancillary problems. Nor, with perfectly snug engagement, can any substantial stream of air pass between the open face of the leading container and the plate. As soon, however, as retraction of the plate starts, a channel is opened for the passage of air at high velocity over the open face of the leading container, the negative pressure is developed, and the leading container follows the plate in its retraction movement. When the retraction has proceeded to a suitable point, impact of the air stream on the plate ceases, either by virtue of the fact that the plate has moved out of the path of the air stream or by virtue of the fact that the air stream has been shut off, or both. In consequence, the negative pressure which at first held the leading container against the plate vanishes. The positive pressure on its closed face has also vanished due to separation of the first container from the second one. Since the pressures on both faces are now atmospheric, there is no longer any force holding the leading container against the plate, and the leading container is removed, e.g., by falling away from the plate under the action of gravity, or in any desired way.

Retraction of the plate from its initial position and its return to that position may take place along any convenient path, straight or arcuate, to suit circumstances. Thus, if the stack is placed on a horizontal table with the open face of the leading container exposed at the top of the stack, the peripheral edge of this container lies in a horizontal plane. Hence the plate, in its initial juxtaposed position, is also horizontal and the first part, at least, of the retraction movement is vertically upward. If, to the contrary, the stack is placed on a support with the open face of the leading container in an approximately vertical plane, the initial attitude of the plate is in the same plane or in a plane approximately parallel with and close to it, and the first part, at least, of the retraction movement is in an approximately horizontal direction. In one arrangement, the plate is pivoted to rock about a horizontal axis above the upper edge of the leading container. When removal of the leading container is to take place, the plate is rocked through a suitable angle, e.g., forty-five to seventy degrees. On completion of the rocking movement the plate, to which the leading container clings, has adopted a nearly horizontal attitude, whereupon the detached container falls, open face up, onto a receiving member. When, to the contrary, the retraction and return movements of the plate follow a rectilinear path then, if the initial attitude of the leading container is such that its open face lies in an approximately vertical plane, the apparatus may include a hook which catches one of its edges and topples it, causing it to orient itself into a desired attitude in the course of its fall.

In most cases it is of advantage to cause the stack to advance toward the plate by small steps, one for each detachment and removal operation. It is then important to prevent excessive gross forward movement of the stack as a whole. If gravity or a continuously acting driver are relied upon to advance the stack, latches or equivalent restraining members may be included to hold back all the remaining containers of the stack after the leading one has been removed, and these latches are released when the plate is returned to its initial juxtaposed position for detachment of the next container. Alternatively, the support for the stack may be horizontal, or so nearly horizontal that gravity is more than offset by the friction between the containers of the stack and the support on which they lie, in which case a mechanism may be included which, acting with intermittent oscillatory motion on the closed face of the last container of the stack, pushes the entire stack forward toward the plate only while the plate occupies its juxtaposed position. The plate itself, then, does double duty: when in its juxtaposed position it prevents forward movement of the stack as a whole; and as it is retracted, it draws the leading container with it. There being no longer any forward push from the intermittent driver mechanism, the stack as a whole moves backward only to the extent that the backward-urging air pressures compress it or overcome the friction between the containers and their support. The stack as a whole then awaits the return of the plate for detachment of the next container, whereupon the driver delivers its next push to the closed "rear" face of the last container of the stack.

The invention will be fully apprehended from the following detailed description of illustrative embodiments, taken in connection with the appended drawings in which:

FIG. 1 is a perspective view of apparatus embodying the invention;

FIGS. 2 and 3 are diagrams depicting the operation of the apparatus of FIG. 1 at two successive phases of the operation cycle;

FIG. 4 is a diagram showing an alternative to a part of the apparatus of FIG. 1 in the same phase as that depicted in FIG. 2;

FIGS. 5 and 6 are cross-sectional views of apparatus alternative to that of FIG. 1 in two different positions;

Figure 7:
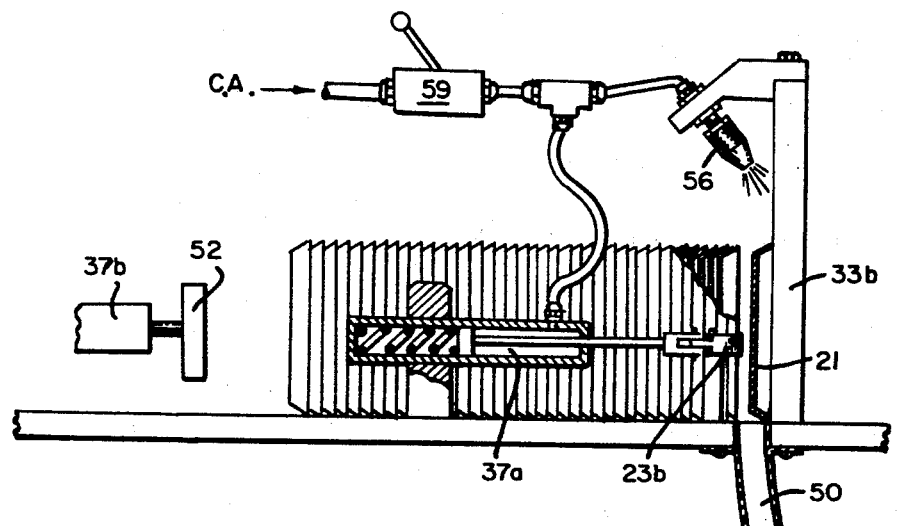
FIGS. 7–12 are schematic diagrams depicting further embodiments of the invention.

Referring now to the drawings FIG. 1 shows a sloped guide 1 into which a stack of nested containers to be dispensed is loaded and out of the lower forward end or discharge port 5 of which individual dual containers are to be detached from the stack 7, removed one by one and placed, in order, on a conveyor, e.g., a belt 9 mounted below the forward end of the guide 1 and indicated as moving from right to left. As the individual containers are removed from the stack, the remainder of the stack advances forward and downward, the lower edges of the containers of which it is constituted sliding on rails 11. To hold the stack 7 in proper alignment as it advances the locations of the sidewalls 13 of the guide 1 are adjustable to suit the long dimensions of the containers. Adjustment screws 15 are provided for the purpose.

With a guide having smooth, parallel inner surfaces, a slope of its axis at a substantial angle, e.g., twenty degrees, from the horizontal, is usually sufficient, through the action of gravity, to urge the nested stack 7 forward and downward. Even in this case, positiveness of the forward movement may be ensured by provision of a spring-loaded drive 17. The tension of the springs 19 may be so light that the driver 17 may easily be drawn back to the entrance end 3 of the guide 1 to permit reloading it. The driver 17 or some equivalent must, of course, be included if the axis of the guide is sloped upward or not sloped at all.

In the position shown, the leading container 21 of the stack 7 is restrained from moving further forward by latches 23 which are urged by springs 25 into engagement with the edge of the open face of the leading container 21. These latches 23 are so constructed as to be readily disengaged by application, to the forward points of the latches, of forces such as to overcome the forces of the springs 25. Of course, other means may be employed to actuate them.

A tube 27 having a closed far end and an open near end and pierced by a plurality of orifices 29 is disposed adjacent the lower edge of the discharge port 5 of the guide 1. In operation air under pressure, for example forty pounds per square inch, is applied to this tube. When a valve 31 is open a jet of air emerges at high velocity from each of the several orifices 29. The orifices are pierced through the wall of the tube 27 in such a way that the jets emerging from them lie in a substantially parallel plane. In most cases a single orifice or nozzle suffices.

Above the conveyor 9 a flat plate 33 is disposed in a plane parallel with the plane of the discharge port 5 of the guide 1. In the juxtaposed position shown, it abuts against the ends of the side walls 13. While minor departures from flatness and from parallelism do not adversely affect the performance of the apparatus and while, indeed, a curvature, simple or compound, may be advantageous in special cases, flatness makes for ease of fabrication of the plate 33 and and parallelism makes for optimal performance in the usual case in which the open face of each container of the stack 7 lies in a plane. The flat, parallel plate 33 has been found sufficient for containers of widely different shapes and insufficient for none of them.

When retraction of the plate 33 is desired, it may be mounted on a piston 35 which is caused to reciprocate laterally over the conveyor 9, for example by an air cylinder 37 of well known variety to which compressed air is supplied from any convenient source, for example, the source which supplies compressed air to the tube 27.

The air cylinder 37 is constructed to provide a piston stroke, and therefore a movement of the plate 33, between a forward or inward position in which it abuts against the ends of the walls 13 at the discharge port 5 of the guide 1 and a rearward or outward position in which the free fall of the successively detached containers of the stack 7 is not interfered with.

In its inward or juxtaposed position the plate 33 acts in four ways. First, by engagement of a plunger 39 supported on the side of the plate 33 with another plunger 41 which controls the valve 31, it turns on the compressed air. Second, because it projects beyond one edge of the leading container 21 and over the air tube 27, it deflects the streams of air which issue from the orifices 29 onto this exposed edge so that some of the air finds its way between each container and the next while another part passes over the open face of the leading container 21. Third, by virtue of its disposition parallel with the open face of the leading container 21 of the stack 7, it constricts the channel through which the second part of the air stream travels across this open face and so increases its velocity and augments the negative pressure developed by unaided air flow. Fourth, by engaging the forward ends of the latches 23 it releases them so that the leading container 21 can be detached while all the others are urged backward by air pressures against the action of gravity, and against the tension of the driver springs 25 when the driver is included.

It is of course not essential that the valve 31 be controlled, or the latches 23 be released directly by the plate 33 itself. It is only necessary that these operations take place at the proper times, and any mechanism that secures this result suffices. Indeed, the latches 23 and the valve 31, while features of the embodiment of FIG. 1, are merely conveniences, in contrast to essentials. In embodiments to be described below, the air-channel-constricting plate itself holds back the stack as a whole and the latches are omitted. In certain of these embodiments, too, the air stream may be uninterrupted, so that the valve 31, too, may be omitted.

While any appropriate mechanism may be employed for retraction and return of the plate 33, the air cylinder 37 is selected for two reasons. First, the invention already requires provision of a source of compressed air for projection of the air stream, and the same source may evidently be employed to operate the air cylinder 37. Second, with such an air cylinder, its mode of operation may readily be altered from that in which it oscillates periodically at a preassigned rate to that in which, at the touch of a valve-operating button, it undergoes a single cycle of retraction and return, whereupon it awaits a second starting signal, and repeats its single cycle operations. Under some circumstances oscillatory operation is desired, while under other circumstances it is preferable that each cycle take place only when initiated by a human operator. Air cylinders are available commercially which operate in either mode.

In the diagram of FIG. 2 in which the guide 1, its latches 23 and the air cylinder 37 have been omitted for the sake of simplicity, four containers 7 are shown, nested and stacked along a horizontal line, together with the air tube 27, in cross-section showing air emerging from one of the orifices 29. The plate 33 is also shown at the inward extremity of its excursion in which it is juxtaposed with and slightly spaced from the open face of the leading container 21 and has just opened the air valve 31 and released the latches 23. The center line of the air stream emerging from the orifices 29 is directed toward the extended portion of the plate 33. The plate 33 deflects the air stream toward the exposed edge of the leading container and provides a narrow channel through which a part of the air stream passes over the open face of the leading container so that its travel through this channel is rapid, thus to develop a negative pressure on the open face. Either directly, by virtue of its divergence after issuing from the orifices 29 or by virtue of deflection by the extended portion of the plate 33, some of the air impinges on the narrow slot defined by the edge of each container and the edge of the next one, and especially on the slot between the first container and the second. These slots are so narrow, and the air passages beyond the slots are so constricted by virtue of the tapering sides of the containers, that the flow of this air takes place through these passages at low speed; i.e., the flow of this part of the air stream is highly impeded. This impedance makes for the development, between each container and the next one, of a positive pressure. Because of the disposition of the air jet as deflected by the plate 33 both with respect to the plate 33 and with respect to the edge of the face of the leading container 21, these positive pressures diminish progressively from each container to the next higher numbered one, commencing with the leading container 21.

The effects of these progressively diminishing positive pressures between each container and the next and the negative pressure adjacent the open face of the leading container are illustrated in FIG. 3 which shows that the leading container 21 has moved forward to the plate 33 while all of the others have moved backward. At this moment the piston of the air cylinder 37 of FIG. 1 commences its withdrawal movement, the plate 33 is retracted, the leading container 21, now detached from the stack 7, follows it, and the latches 23 are reengaged to hold the remainder of the stack 7 in place. After the leading container 21 has been withdrawn to a suitable distance a hook 43, mounted on the frame of the apparatus, engages its upper edge and halts its advance, while the momentum of the container carries it along, pivoting about its center of gravity into an attitude to drop, open face up, onto the conveyor 9. The leading container 21 is shown, in the act of thus pivoting and falling, in FIGS.

5 and 6. At or just before the instant at which this action takes place the air stream is advantageously turned off so that the container can fall to the conveyor without risk of being blown away. The upper margin of the plate 33 may be provided with a slot so that the plate can travel back and forth without interference from hook 43.

While the orientation of the orifices 29 of the tube 27 is not critical in the structure of FIGS. 1, 2 and 3, it is still less so when this structure is modified to add a curved side to the plate as shown in FIG. 4. To avoid interference by the curved side 34 of the plate 33a with the dropping of the successive containers onto the conveyor 9, the compressed air tube 27 is located above the guide 1 instead of below it as in the cases of FIGS. 1, 2 and 3. With a plate 33a having a curved side 34 as in FIG. 4, the orifices 29 may be arranged to deliver air in a direction substantially parallel with a tangent to the curve at its leading edge. The air then follows the inside face of this curved portion of the plate, a substantial part of it passing between the plate and the open face of the leading container 21 to develop a negative pressure while some of it enters the channels between each container and the next to develop positive pressures between them.

In FIG. 1 the axis of the guide 1 is arranged at an angle of about 45° to the horizontal while the stroke of the air piston 35 is substantially horizontal. This is to ensure that the plate 33, at one extreme of its movement, shall not interfere with the margin of the conveyor 9 and at the same time that the discharge port 5 of the guide 1 shall not lie far above the opposite margin of the conveyor. This arrangement entails, however, that the plate 33 be angularly fixed to the air-driven piston 35 as shown in FIG. 1.

Substantially the same result can be secured by arranging that the entire apparatus be pivoted at a point above one margin of the conveyor 9. Such an arrangement is shown in the horizontal position in FIG. 5 and tipped up so that the guide 1 slopes downwardly in FIG. 6. As an alternative detail, the guide 1 of FIGS. 5 and 6 is constructed entirely of rails, i.e., side rails 45 as well as the bottom rails 11 of FIG. 1. With a pivoted mechanism, as shown in these figures, the plate 33 may be mounted with its face normal to the axis of the air piston 35 and, when the frame is rocked about its pivot, as shown in FIG. 6, the plate 33 remains always parallel with the discharge port 5 of the guide 1.

In FIGS. 5 and 6 alike, which differ only in the tilt of the apparatus as a whole, the leading container 21 of the stack 7 has been detached and partially withdrawn to a point at which the movement of the upper edge of its open face is suddenly impeded by the hook 43. As in the case of FIG. 1 the momentum of its lower edge carries the container 21 along, pivoting it about its center of gravity and allowing it to drop, open face up, onto the conveyor 9.

In the foregoing embodiments, the plate 33 is shown as overlying the major part of the area of the open face of the leading container 21. While this may be advantageous, it is not essential. It is necessary only that the plate extend beyond an edge of the leading container, that the air stream be directed toward the extended portion so that part of the air, directly or after deflection by the extended portion of the plate, impinges on the edge of the leading container, and that the plate overlie a sufficient fraction of the area of the open face to develop the necessary high air velocity and the resulting negative pressure. Thus, for example, the presence, in the plate 33, of the slot which accommodates the hook 43 does not reduce the efficacy of the air pressure-actuated detachment operation. The same remarks apply to the embodiments of which the descriptions follow.

When the air jet exerts a sufficient force to hold back all the containers but the first, and especially when the nested containers are exceptionally shallow trays, i.e., trays whose depths are less than the spacing between the latches in their engaged positions and the plate in its juxtaposed position, detachment and removal can be accomplished without retraction of the plate 33. Thus, delivery of the air stream simultaneously with release of the latches by any appropriate means causes the leading tray to advance to a position in which, as shown in FIG. 3, it engages the plate 33. The air stream continuing, the leading container, thus detached, is blown upward out of the discharge port of the guide. Once it is entirely free of the plate 33 it may be caught in a supplementary sloping guide as in an inverted rain gutter, along which it is blown to a suitable delivery point and dropped.

Better still, the nozzle or orifice which delivers the air stream and the extension of the plate 33 on which it impinges may be mounted above the discharge port 5 as in FIG. 4, instead of below, as in FIG. 1. With sufficient spacing between the plate in its juxtaposed position and the leading container 21 of the stack, this leading container, once detached as shown in FIG. 3, and once the air stream has been turned off, can fall downward instead of being blown upward. FIG. 7 shows such an arrangement, wherein the leading container 21, detached by the air stream from a nozzle 56 and moved toward a plate 33b, falls into a curved chute 50 which carries it to a delivery point 51. In this case, of course, the latches 23b must be released for detachment of the leading container 21 and thereafter re-engaged. Any suitable mechanism, such as an air cylinder 37a serves the purpose. FIG. 7 also shows an intermittently acting driver 52 in contrast to the continuous driver 17 of FIG. 1. This, too, may be actuated by an air cylinder 37b. A valve 59 is included in the air line to the nozzle 56 by which the air jet can be turned on and off as required.

Figure 8:
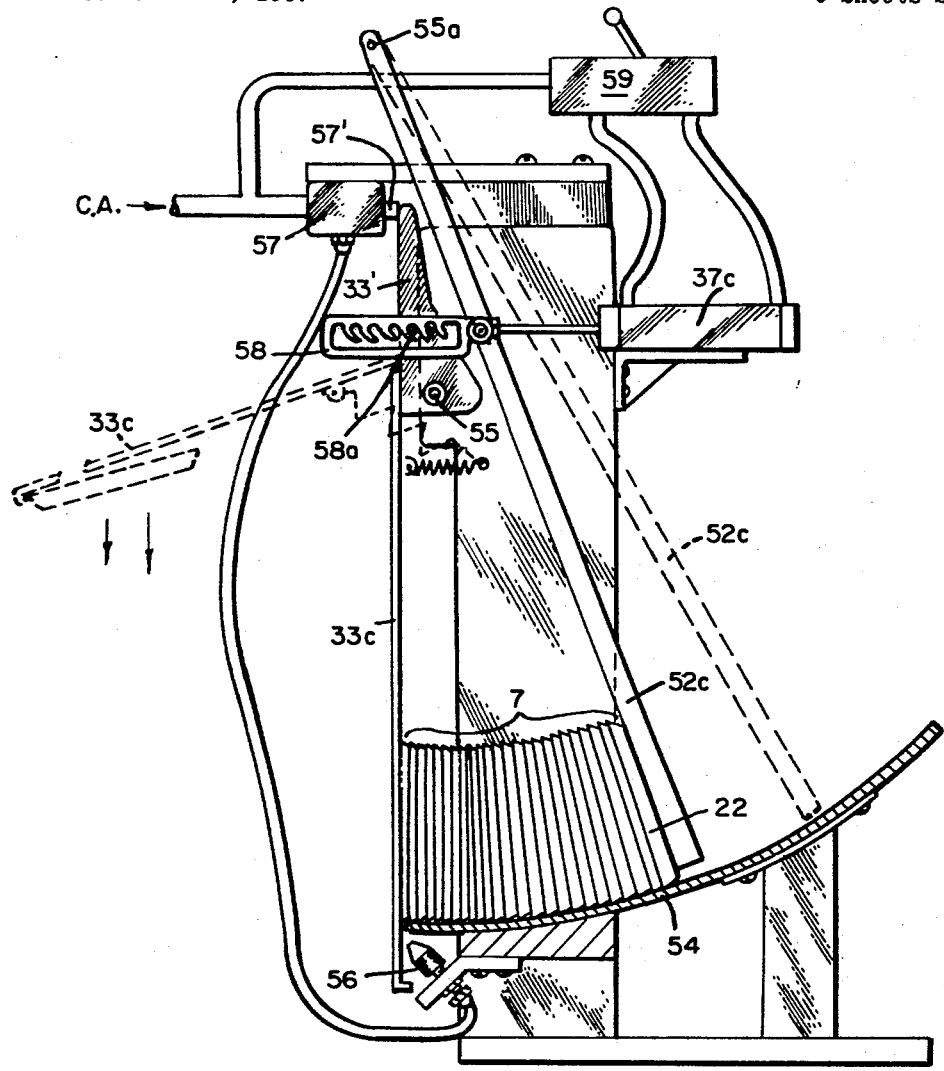

The side walls 13 of FIG. 1 ensure against accidental disorientation of the stack of containers, provide convenient support for the latches 23, and provide positive stops against which the plate 33 bears, when in its juxtaposed position. But when there is no serious danger of disorientation of the stack 7 and when the plate of the invention is relied upon to prevent emergence of the stack as a whole from the delivery point of the guide, side walls and latches may be omitted. FIG. 8 shows an embodiment of the invention having neither side walls nor latches. The support or guide 54 is merely a smooth surface, e.g., of sheet metal, of which the emergence end is disposed in a horizontal plane or a plane tilted slightly upward. A plate 33c disposed to rock about a horizontal pivot 55 above the emergence end of the support 54, abuts against this end of the support when in the juxtaposed position shown in solid lines. The open face of the leading container of a stack 7 bears snugly against this plate. An air jet is directed by a nozzle 56 against an extended portion of the plate 33c and by deflection against the exposed edges of the first few containers of the stack 7. When the leading container is to be removed, the plate 33c is swung outward into a nearly horizontal position as shown in broken lines.

Immediately on the commencement of this movement, a channel is opened between the plate 33c and the open face of the leading container, and air from the nozzle 56 travels at high speed through this channel and develops a negative pressure over the open face. The leading container is thus detached from the stack 7 and follows the plate 33c in its swing until no longer acted upon by the air stream, whereupon the detached container falls away. To ensure that, in its fall, it shall not be blown aside by the air stream, the air may be turned off by a valve 57 before the moment of dropping, e.g., by retraction of an upwardly extending member 33' from a plunger or button 57' which controls the valve 57. With sufficiently precise direction of the air jet, however, this refinement is not necessary.

When the leading container has been detached, the plate 33c is returned to its juxtaposed position and an intermittently acting driver element gives a gentle pat to the bottom of the last container 22 of the stack 7 thus to drive the stack as a whole forward by small distance such that the peripheral edge of the open face of the next container, now in its turn the leading one, engages the plate 33c. For greatest simplicity, the intermittent driver is shown as a second plate 52c, disposed to rock about a horizontal pivot 55a, above the supporting guide 54. To accommodate a stack of substantial length without resort to excessive height of the pivot 55a, the rearward portion of the support or guide 54 may have an arcuate form.

The plate 33c and the intermittent driver 52c may be rocked in opposite angular directions about their respective pivots 55, 55a and in synchronism by any convenient mechanism such as an air cylinder 37c and links of appropriate lengths. The link which actuates the plate 33c includes a slotted member 58 having a plurality of sloped teeth, one or another of which engages a pin 58a fixed to the upwardly extending member 33' which, in turn, is fixed to the plate 33c. The teeth are sloped to permit lost motion. With this arrangement or an equivalent one the plate 33c, in each cycle of operation, rocks from its juxtaposed position to a preassigned dropping position and back again, while the intermittent driver 52c rocks through a considerably smaller angle about a mean position which changes as the number of containers remaining in the stack 7 is reduced.

As shown, the air cylinder 37c is provided with a port at each end. Admission of air into one port causes outward rocking of the plate 33c and the drive 52c while admission of air to the other port rocks both of these elements inward. A selector valve 59 determines to which port the air is thus admitted.

Figure 9:
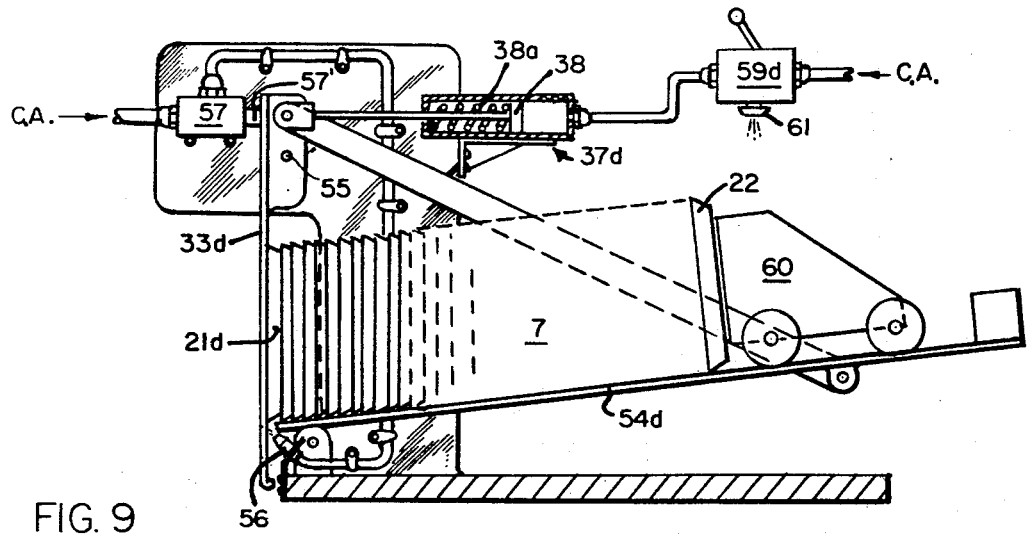
Figure 10:
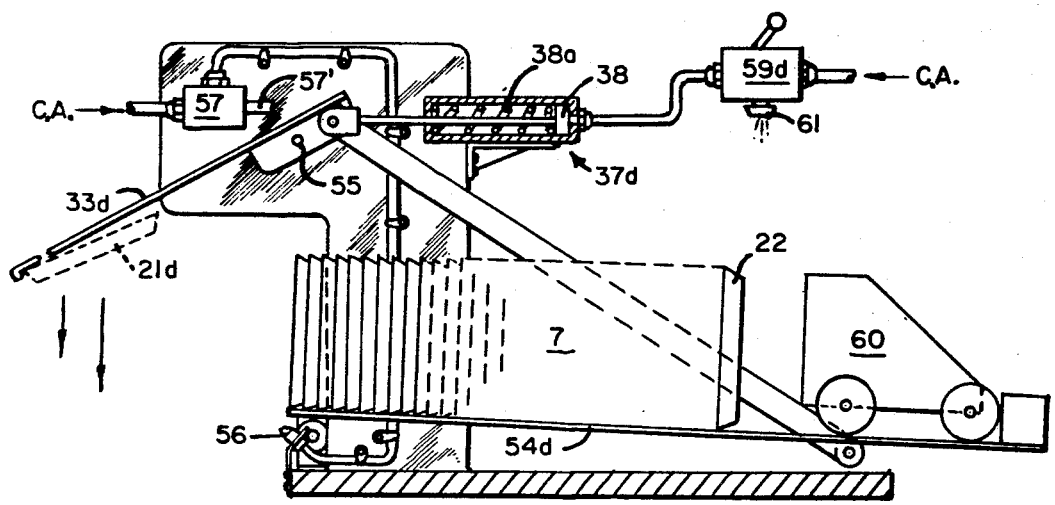

FIGS. 9 and 10 show another embodiment in which the supporting guide 54d is flat throughout its length. FIG. 9 shows it in the cycle phase in which the plate 33d occupies its juxtaposed position, while FIG. 10 shows it in the container-dropping position. As with the embodiment of FIG. 8, the plate 33d rocks about a pivot 55 above the emergence point of the guide 54d. Detachment and removal of the leading container 21d of the stack take place as before. A carriage 60 is disposed to roll freely on the surface of the guide 54d. The guide 54d itself is rocked through a small angle in synchronism with the rocking of the plate 33d through a large one, the guide rocking backward when the plate is in its retracted position and forward when the plate occupies its juxtaposed position. The driver 60 rolls "forward" when, and only when, the stack 7 as a whole is restrained from falling off the guide by the plate 33d, and as it rolls forward it gives a gentle pat to the bottom of the rear container 22 of the stack, thus to bring the peripheral edges of the open face of the next container into juxtaposition with the plate 33d in readiness for the next detachment operation. Synchronous rocking movements of the plate 33d and the supporting guide 54d may be provided, as before, by an air cylinder 37d and linkages of appropriate lengths.

While the air cylinder may be of the two-port variety shown in FIG. 8, in which the movement of the piston in each direction is driven by the air admitted to one end of the cylinder or the other, it is here shown, to illustrate a variation, as of the one-port variety with a return spring. The piston 38 is driven, against the force of a return spring 38a in one direction when an air valve 59d is opened. When the air valve is closed, the spring 38a returns the piston 38 to its initial position, the air which it contains escaping through a leak 61, provided for the purpose as a part of the valve 59d.

The rolling movements of the driver carriage 60 are governed principally by its inertia. Consequently they lag somewhat behind the rocking movements of the guide 54d. This provides further ensurance that the driver 60 shall not push the stack 7 forward until after the plate 33d shall have been returned to its juxtaposed position.

Figure 11:
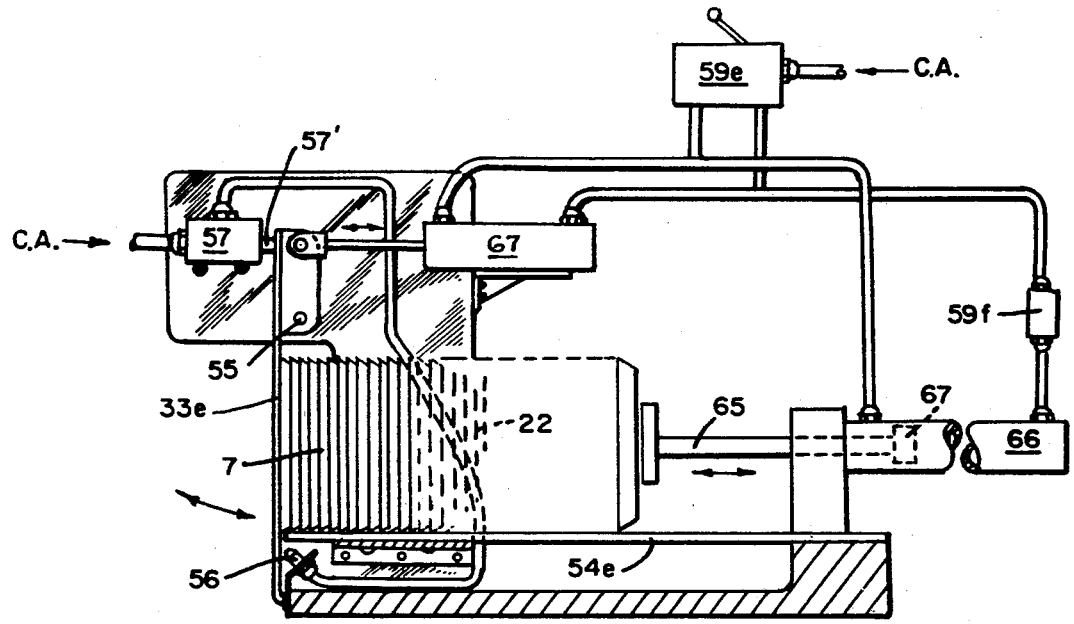

FIG. 11 shows another embodiment in which the stack 7 is intermittently urged forward at moments when the plate 33c is in its juxtaposed position by a rod 65 coupled to the piston 67 of an air cylinder 66 to which air is supplied through a selector valve 59e and a pressure reducer 59f. The piston 67 advances in each cycle and in the absence of any restraint, by the full length of its stroke and then returns. Bearing against the bottom or closed face of the rear container 22 of the stack 7, it urges the stack forward so that the open face of the leading container bears against the plate 33e in its juxtaposed position. Undue compression of the stack and unwanted movement of the plate 33e are prevented by the air pressure reducer 59f which provides a very low pressure in the advancing cylinder. As before, the plate 33e is rocked by an air cylinder 67 and in synchronism with the movements of the driver rod 65.

Figure 11A:
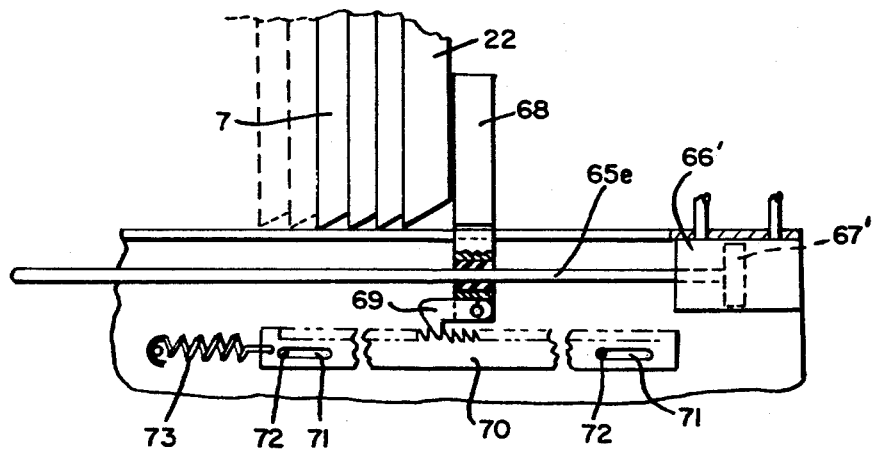
FIG. 11a is a schematic diagram showing a detail of the embodiment of FIG. 11.

As described in FIG. 11, the length of the air cylinder 66 to accommodate the required piston movement is as great as that of the full stack 7 of containers. In some circumstances this may be considered undesirable, in which case the refinement shown in FIG. 11a may be used. Here, a rod 65e of the necessary full length is coupled to the piston 67' of an air cylinder 66' but the length of the cylinder itself, and consequently the movement of its piston 67' and of the rod 65e, may be as little as an inch or two. A driver element 68 fits with a controlled amount of friction, around the rod 65e. Forward movement of the piston 67' and the rod 65e when not obstructed, advances the driver 68 through the agency of the friction between the rod 65e and the driver 68. When the rod 65e is drawn backward, a pawl 69 which depends from the driver 68 engages one or another of the teeth of a ratchet 70 which is of approximately the full length of the stack of containers and, in turn, is free to move through a restricted distance which is less than the movement of the piston 67 and which is determined by the lengths of slots 71 through which pass pins 72 fixed to the frame of the apparatus. A light spring 73 also attached to the frame, draws the ratchet 70 forward but with a force less than the frictional force between the rod 65e and the driver 68.

With this arrangement, the driver 68 pats the bottom of the rear container 22 of the stack 7, of whatever length the stack may be; and as the length of the stack is reduced by removal of the successive containers, the pawl 69 eventually rides over the top of one tooth of the ratchet 70 and engages the next tooth. Operation then continues as before, the driver 68 advancing slightly with the removal of each container, until all have been removed.

Figure 12:
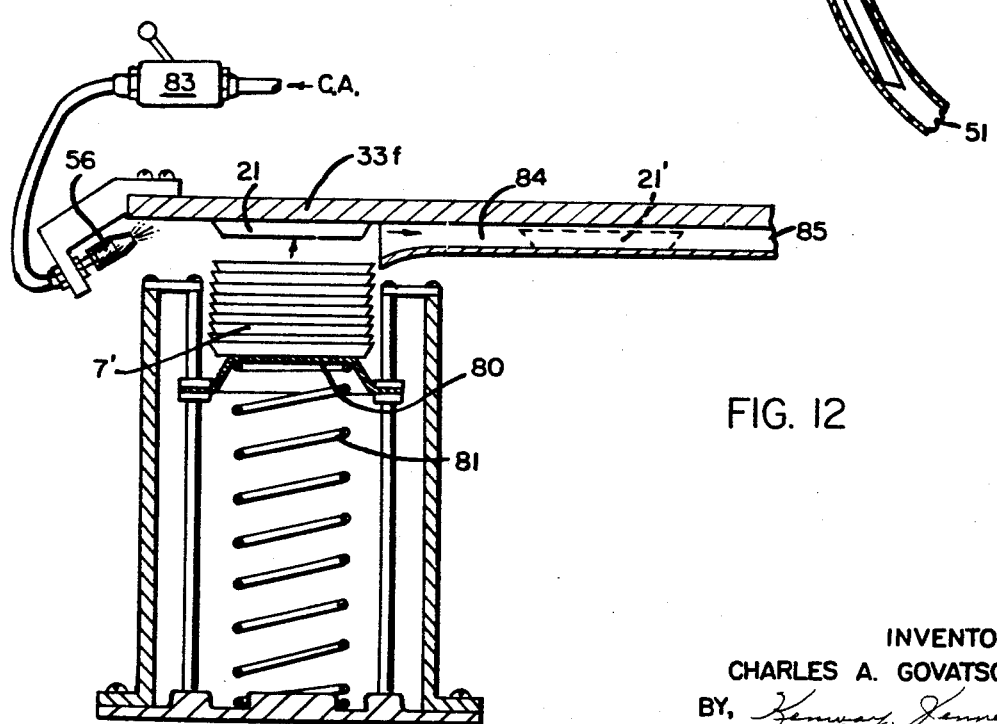

FIG. 12 shows what is perhaps the simplest embodiment of the invention. Here, a stack 7' of containers, e.g., shallow trays, stands on a horizontal table 80, the open face of the leading or uppermost container being exposed at the top of the stack. The table 80 is supported on a spring 81 which is matched to the weight of the stack 7' in such a way that, however many containers remain in the stack, the open face of the leading container is spaced by only slightly more than its depth dimension from a fixed plate 33f. When an air valve 83 is opened, an air stream is projected through a nozzle 56 against an extended portion of a plate 33f near the exposed edges of the uppermost containers. In the manner shown in FIGS. 2 and 3, the uppermost container 21' is detached and rises to the plate 33f. It is then blown into a guide 84 to a delivery point 85. Advantageously, the air valve 83 is closed as soon as the leading container 21' has been detached so that the next container of the stack shall not follow it until it is wanted. The closure of a conventional air valve does not take place instantaneously. Hence after it has been nominally closed, a weak air stream continues to flow through the nozzle 56 for a brief interval. This is sufficient to blow the detached container 21' into the guide 84 but not sufficient to detach the next container.

More positive and precise in its action, as well as more complex in construction, than the simple table-supporting spring 81 shown, a motor may raise the table, as the successive containers are removed from the stack, under control of a so-called "electric eye" arrangement or any other sensing device that can sense and respond to the position of the uppermost container of the stack.

If preferred, instead of advancing the table in the upward direction as the successive containers are removed, the plate and the guide may be advanced downward, in which case the nozzle through which the air is projected should, of course, be attached to the plate and not to the frame of the apparatus. In this way the proper orientation and disposition of the air stream with respect to the extended portion of the plate and the edges of the uppermost containers is preserved.

Various structures and mechanisms alternative to those shown and described above for carrying out the detachment, removal and dispensing operations of the invention will suggest themselves to those versed in the art.

What is claimed is:

1. Apparatus for dispensing open-faced hollow containers that are arranged in a nested stack which comprises:

supporting means disposed to support said stack;

a plate juxtaposed with the open face of the leading container of said stack, said plate extending beyond a peripheral edge of said open face in at least one direction;

means for projecting a stream of air upon the extended portion of said plate and upon said peripheral edge, thereby to establish progressively diminishing positive pressures at least between the leading container and the next succeeding container, and, through constriction by said plate of the air channel across said open face from said edge toward an opposite edge, to establish a negative pressure adjacent said open face, said negative air pressures acting to detach said leading container from said stack, urging it toward said plate, and said positive pressure acting to assist in the separation of the leading container from the stack while at least restraining the succeeding container from following the leading container as the latter is detached;

first means adapted to increase the spacing between said plate and said stack, thereby to remove the leading container completely from said stack;

said first means thereafter eliminating said increase of said spacing, thus to restore the juxtaposition of the plate in relation to the open face of the new leading container of the now reduced stack; and means adapted to advance the stack along said supporting means toward said plate.

2. Apparatus as defined in claim 1 wherein said supporting means is proportioned and disposed to support said stack on its side, with the open face of the leading container exposed near the forward end of the supporting means and along which the stack may advance in a direction substantially normal to the plane of said open face.

3. Apparatus as defined in claim 1 wherein said first means comprises means for retracting said plate from its initial juxtaposed position by a distance in excess of the width dimension of a container, said means being operative after the removal of the leading container for returning said plate to its initial juxtaposed position.

4. Apparatus as defined in claim 3, in which said means to advance the stack along said supporting means toward said plate operates only when said plate occupies its juxtaposed position, thus to replace the detached container by the next container of the original stack as the leading container of the reduced stack.

5. In combination with apparatus as defined in claim 3, means for orienting said removed leading container into a desired attitude.

6. Apparatus as defined in claim 3 wherein said advance-causing means comprises an element continuously urging the stack as a whole toward a discharge point, and including means for restraining the leading container of the stack from emerging from said discharge point, and means for releasing said restraining means at the moment when emergence of the leading container is desired and for reengaging said restraining means after the leading container has initially been separated from the succeeding container.

7. Apparatus as defined in claim 4 wherein said advance-causing means comprises an element that bears intermittently on the closed face of the last container of the stack, and so urges the stack as a whole toward a discharge point, and means for restricting such bearing and urging to times when the plate occupies its juxtaposed position.

8. In combination with apparatus as defined in claim 1, means for cutting off the projection of the air stream when the relative spacing between the plate and the stack has attained such a magnitude that the detached container is completely free of the stack and can emerge from the apparatus without interference from elements of the apparatus.

9. Apparatus as defined in claim 3 wherein said plate is disposed in a plane substantially parallel with the plane of the open face of the leading container and wherein said means for retracting and returning said plate moves said plate in translation along a substantially linear path.

10. Apparatus as defined in claim 3 wherein said supporting means lies in an approximately horizontal plane, whereon the stack lies with the open faces of the containers in approximately vertical planes, and wherein said plate-retracting means is pivoted to rock about an axis located above, and approximately parallel to, the upper edge of the periphery of the open face of the leading container.

11. Apparatus for dispensing like, open-faced, hollow containers singly and in a desired orientation which comprises a hopper having a discharge port, said hopper being proportioned to support a stack of nested containers and to guide them, open faces forward and parallel with said discharge port, toward said discharge port, means urging said stack toward said discharge port, means for restraining the leading container of the stack from emerging from said discharge port, a plate disposed transversely to the axis of said hopper and spaced from the open face of the leading container of said stack by a distance no greater than several times the depth dimension of a container, means for projecting a stream of air upon a peripheral edge of the open face of the leading container of said stack and upon an extending portion of said plate, thereby to establish negative pressure adjacent said open face and progressively diminishing positive pressures between each container and the next, and means for momentarily releasing said restraining means, whereupon said leading container is urged forward by said air pressures to emerge from said discharge port while all other containers of said stack are urged in the reverse direction, to be caught and held when said restraining means are re-engaged.

12. Apparatus for successively removing single members of a set of like, hollow, open-faced containers that are nested and arranged in a stack, and for dispensing them, one by one, which comprises:

means for supporting said stack with open face of the leading container exposed;

a plate disposed in a plane transverse to the axis of said stack, and overlying the open face of the leading container, said plate projecting beyond at least one edge of said open face and extending at least from said edge to an opposite edge, means for initially bringing said open face into juxtaposition with said plate, whereby said plate at least partially covers said open face, means for directing a stream of air toward the projecting portion of said plate to impinge on the interface between said plate and an edge of the leading container, thereby to develop progressively diminishing positive pressures between each container and the next container of the stack, whereupon, under the influence of said positive pressures and assisted by negative pressure that is developed adjacent said open face by constriction of said air stream by said plate, the leading container is detached from the next container, and whereby the containers other than the leading are moved in a backward direction, thus being restrained from following the leading container, means for transferring said disengaged container to a utilization point, and means for advancing the stack of containers thereby preserving the relation between the juxtaposed position of said plate and the open face of the successive containers as they become leading ones in turn as the number of containers constituting said stack is progressively diminished.

13. Apparatus for dispensing like, open faced, hollow containers that are arranged in a nested stack which comprises:

means disposed to support said stack, a plate juxtaposed in parallel relation with the open face of the leading container of said stack and spaced from said open face by a distance no greater than several times the depth dimension of a container, said plate extending beyond a peripheral edge of said open face in at least one dimension;

means for projecting a stream of air upon said peripheral edge and upon the extension of said plate;

means for actuating said latter means, thereby to establish progressively diminishing positive pressures between each container and the next and, through constriction by said plate of the air channel across said open face from said edge toward an opposite edge, a negative pressure adjacent said open face, said air pressures acting to detach said leading container from said stack, urging it toward said plate and urging all other containers of said stack in the reverse direction, whereby removal of said detached leading container is facilitated;

means for preventing detachment and removal of all other containers of said stack until another container is wanted; and means adapted to advance the stack.

14. The method of removing single members of a set of like, hollow, open-faced, containers that are nested and arranged in a stack, the open face of the leading container being exposed at one end of the stack, which comprises:

juxtaposing a plate with the open face of said leading container at a distance from said container no greater than several times its depth, said plate extending beyond the periphery of said open face in at least one dimension, and projecting a stream of air toward the extended portion of said plate in such a direction that, upon being deflected by said plate, one portion of said stream impinges on an edge of the periphery of the open face of the leading container and another portion of said stream travels at high speed through the channel bounded on one side by said open face and on the other side by said plate from said edge of said periphery to an opposite edge of said periphery.

15. Apparatus for dispensing open-faced hollow containers that are arranged in a nested stack, which comprises:

supporting means disposed to support said stack;

a plate juxtaposed with the open face of the leading container of said stack and spaced from said open face, said plate extending beyond a peripheral edge of said open face in at least one direction;

means for projecting a stream of air upon the extended portion of said plate and upon said peripheral edge, thereby to establish a positive pressure at least between the leading container and the next succeeding container, and, through constriction by said plate of the air channel across said open face from said edge toward an opposite edge, to establish a negative pressure adjacent said open face, said negative air pressure acting to detach said leading container from said stack and move said leading container toward said plate, and said positive pressure acting to assist in the separation of the leading container from the stack while at least restraining the succeeding container from following said leading container as the latter is detached, thereby to facilitate removal of the leading container from the stack; and means for causing relative motion between the stack and the plate after each container is removed, thereby to restore the juxtaposition of the plate in relation to the open face of the new leading container of the stack.

References Cited

UNITED STATES PATENTS

| 2,734,657 | 2/1956 | Drese | 221—251 |
| 2,738,899 | 3/1956 | Hansen et al. | 221—251 |
| 3,158,367 | 11/1964 | Tarbuck | 271—26 |
| 3,168,307 | 2/1965 | Walton et al. | 271—26 |

OTHER REFERENCES

German Applic. Das 1,065,430, Germer, 271—26.
German Applic. Das 1,095,853, Schwebel, 271—26.
German Applic. Das 1,060,874, Germer, 271—26.
German Applic. Das 1,148,463, Weber, 271—26.

WALTER SOBIN, *Primary Examiner.*